United States Patent [19]

Iyeta

[11] 4,076,257
[45] Feb. 28, 1978

[54] APPARATUS FOR SUPPORTING PHONOGRAPHIC TONE ARMS

[75] Inventor: Motoi Iyeta, Hamakita, Japan

[73] Assignee: Nippon Gakki Seizo Kabushiki Kaisha, Japan

[21] Appl. No.: 734,961

[22] Filed: Oct. 22, 1976

[30] Foreign Application Priority Data

Oct. 23, 1975    Japan ............................... 50-144791

[51] Int. Cl.² ............................................... G11B 3/10
[52] U.S. Cl. ................................................. 274/23 A
[58] Field of Search ............................... 274/23, 13 R

[56] References Cited

U.S. PATENT DOCUMENTS

| 2,915,315 | 12/1959 | Rabinow | 274/23 A |
| 3,363,909 | 1/1968 | Kozu et al. | 274/23 A |
| 4,007,939 | 2/1977 | Iyeta | 274/23 A |

FOREIGN PATENT DOCUMENTS

| 599,655 | 1/1955 | Canada | 274/23 A |

*Primary Examiner*—Richard E. Aegerter
*Assistant Examiner*—John W. Shepperd

*Attorney, Agent, or Firm*—Ostrolenk, Faber, Gerb & Soffen

[57] ABSTRACT

On a phonographic disc player, a carriage for supporting a phonographic tone arm is movable along a pair of mutually parallel front and back guide rails and an elongated cover arranged between the guide rails while the position thereof normal to the moving direction being constrained in a precise manner through rolling meshing engagement of at least one of its bottom inside wheels with an associated guide rail, a bottom block extending downwardly from the carriage through the back rim horizontal slit in the cover back being operatively coupled to a servo-driving mechanism which is electrically connected to a given tone arm offset angle detecting circuit. Stabilized posture and movement of the carriage resulting from the above-described meshing engagement and relatively low positioned centers of gravity of the carriage and the tone arm and its related parts minimize undesirable tracking distortion and pressure on the stylus tip and minimum but necessary provision of the slit at a position invisible to the user minimizes possible entry of dust and other extraneous matter and enhances the external appearance of the record player.

15 Claims, 7 Drawing Figures

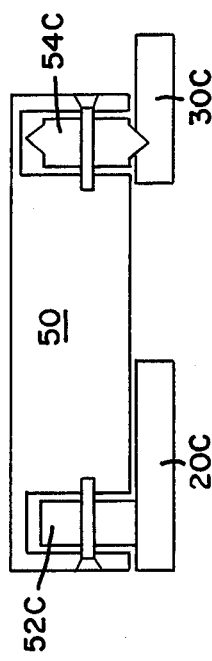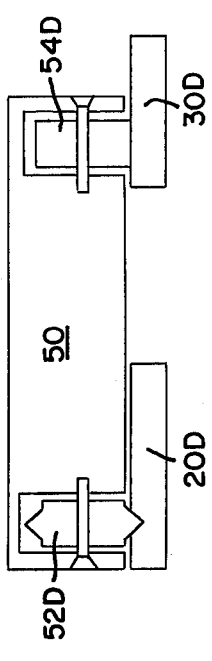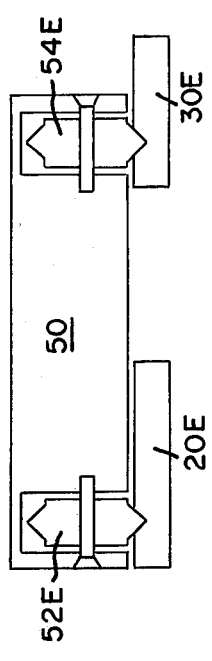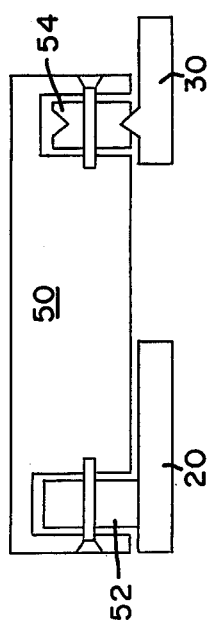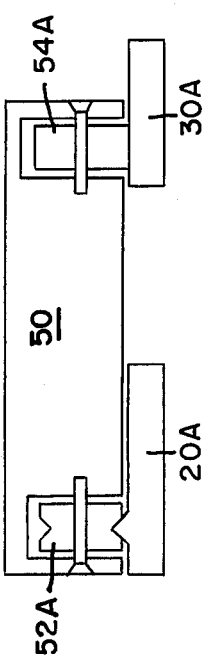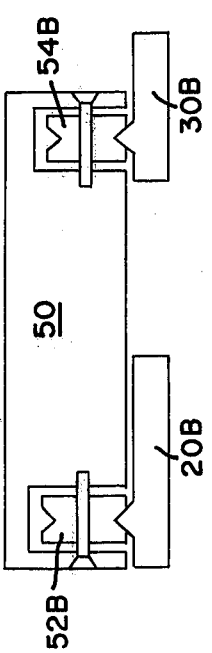

APPARATUS FOR SUPPORTING PHONOGRAPHIC TONE ARMS

BACKGROUND OF THE INVENTION

The present invention relates to improved apparatus for supporting phonographic tone arms, and more particularly relates to improvement in the supporting structure for phonographic tone arms on phonographic disc players of the linear tracking type.

One conventional supporting structure of the linear tracking type is provided with a carriage movable on and along a tract in a direction normal to the radial direction of the turntable, the track being arranged below the bottom of the player board. The tone arm and its related parts are supported by the carriage by way of a connecting rod which extends rearwardly, bends and extends downwardly on the back side of the player board, again bends and extends forwardly through a horizontal slit formed in the back of the player board and is coupled to the top of the carriage via a bearing. This structure may serve for enhancement of the outside design of the disc player as the slit for passage of the connecting rod is provided on the back side of the player board, i.e. at a position almost invisible to the user. However, the complicated curved construction of the connecting rod tends to cause undesirable distortion of the connecting rod against the bearing surface and this distortion may lead to relatively quick wearing-out of the bearing. Such wearing-out of the bearing and its related parts results in disorder in the lateral balance of the tone arm and its related parts. In addition, the relatively high position of the center of gravity of the tone arm and its related parts with respect to the carriage may lead to unstable posture and movement of the carriage on and along the track. Thus, the ability of the supporting structure for minimizing undesirable distortion and pressure on the stylus tip is lowered.

In another conventional supporting structure of the linear tracking type, a carriage moves on and along a track in a direction normal to the radial direction of the turntable, the track being arranged below the bottom of the player board. The tone arm and its related parts are supported by the carriage by way of a straight vertical connecting rod which extends rearwardly through a horizontal slit formed in the top wall of the player board and coupled to the carriage. Although this structure is free of the trouble caused by the distortion of the connecting rod, presence of the slit in the top wall of the player board degrades the outside design of the disc player and allows easy egress of dust and other extraneous matter into the interior of the disc player. Further, even in the case of this supporting structure, the position of the center of gravity of the tone arm and its related parts is still relatively high with respect to the position of the carriage.

OBJECTS OF THE INVENTION

The principal object of the present invention is to provide an apparatus for supporting a phonographic tone arm which assures excellent external appearance of the player disc having substantially no opening at portions easily visible to the user.

Another object of the present invention is to provide an apparatus for supporting phonographic tone arms which assures stable posture and movement of the carriage, thereby effectively minimizing undesirable tracking distorsion and pressure on the stylus tip.

Still another object of the present invention is to provide an apparatus for supporting a phonographic tone arm in which most of the mechanical parts involved in driving of the carriage are concealed from the eyes of the user for improvement of the external appearance of the record player.

BRIEF DESCRIPTION OF THE INVENTION

In accordance with the present invention, a pair of front and back guide rails are arranged in spaced parallel relationship to each other on the top surface of the base member while running normal to a radial line extending from the center of the turntable towards the carriage, and an upwardly projecting elongated cover of a channel-shaped cross section is arranged between the pair of guide rails. The carriage moves on and along the pair of guide rails via its concealed bottom wheels while riding a spaced distance above the cover and is provided with a bottom block which extends forwardly through a horizontal slit formed in the back rim of the cover and downwardly beyond the bottom of the base member for engagement with the given servo driving mechanism. A rolling meshing engagement is established between the wheels of the carriage and at least one of the guide rails in order to constrain the position of the carriage normal to the moving direction thereof.

BRIEF DESCRIPTION OF THE FIGURES

Further features and advantages of the present invention will be made clearer from the ensuing description, reference being made to the embodiment shown in the accompanying drawings, in which:

FIG. 5 is a schematic view corresponding to a portion of FIG. 3 showing a construction in which a projection is formed on the back side rail and grooves are formed in the back side wheels.

FIG. 6 is a schematic view showing a variation of the structure of FIGS. 3 and 5 in which a projection is formed on the front side rail and grooves are formed in the front side wheels.

FIG. 7 is a schematic view showing a further variation of the structure of FIGS. 3, 5 and 6 in which projections are formed on both side rails and grooves are formed in both side wheels.

FIG. 8 is a schematic view showing a further variation of the structure of FIGS. 3, 5, 6 and 7 in which a groove is formed in the back side rail and projections are formed on the back side wheels.

FIG. 9 is a schematic view showing a variation of structure of FIG. 8 in which a groove is formed in the front side rail and projections are formed on the front side wheels.

FIG. 10 is a variation or combination of the structure of FIGS. 8 and 9 in which projections are formed on both side side wheels and grooves are formed on both side rails.

DETAILED DESCRIPTION OF THE INVENTION

Figure 1:
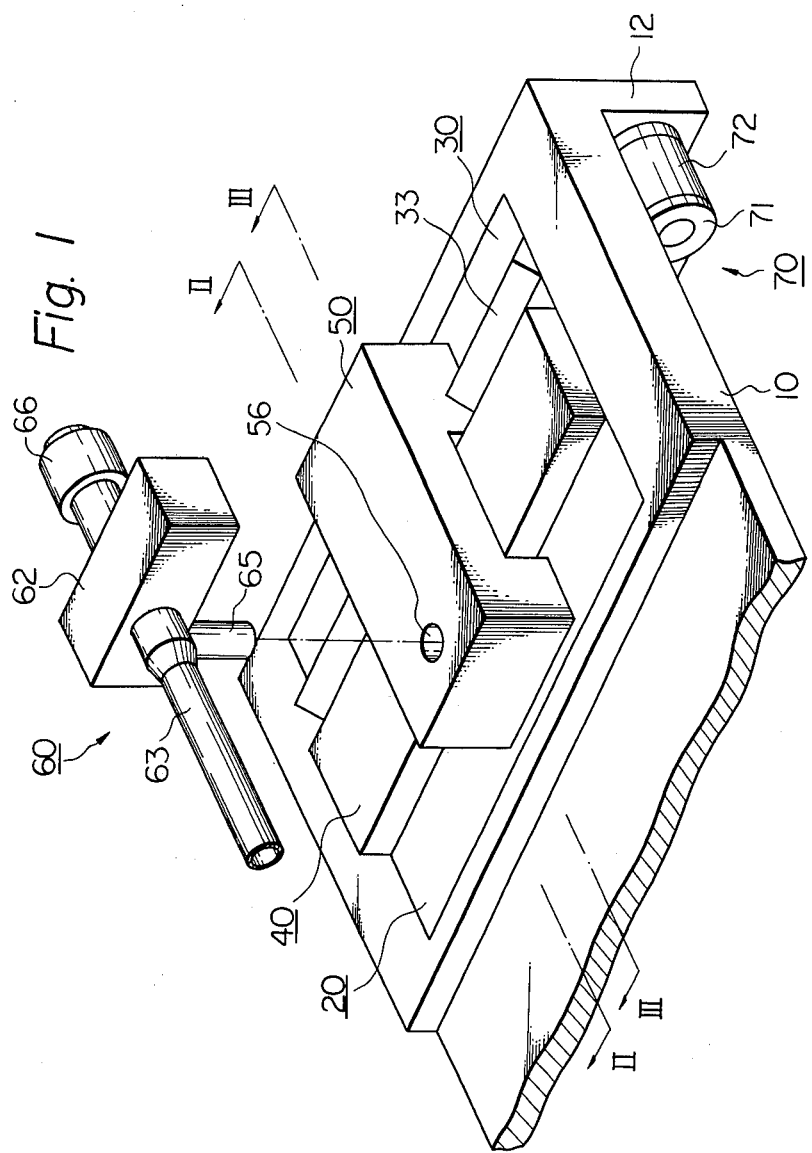
FIG. 1 is a perspective plan view of an embodiment of the apparatus in accordance with the present invention with the tone arm and its related parts shown in exploded fashion for better understanding, and in which portions of the record player have been omitted for purposes of simplicity.
Figure 2:
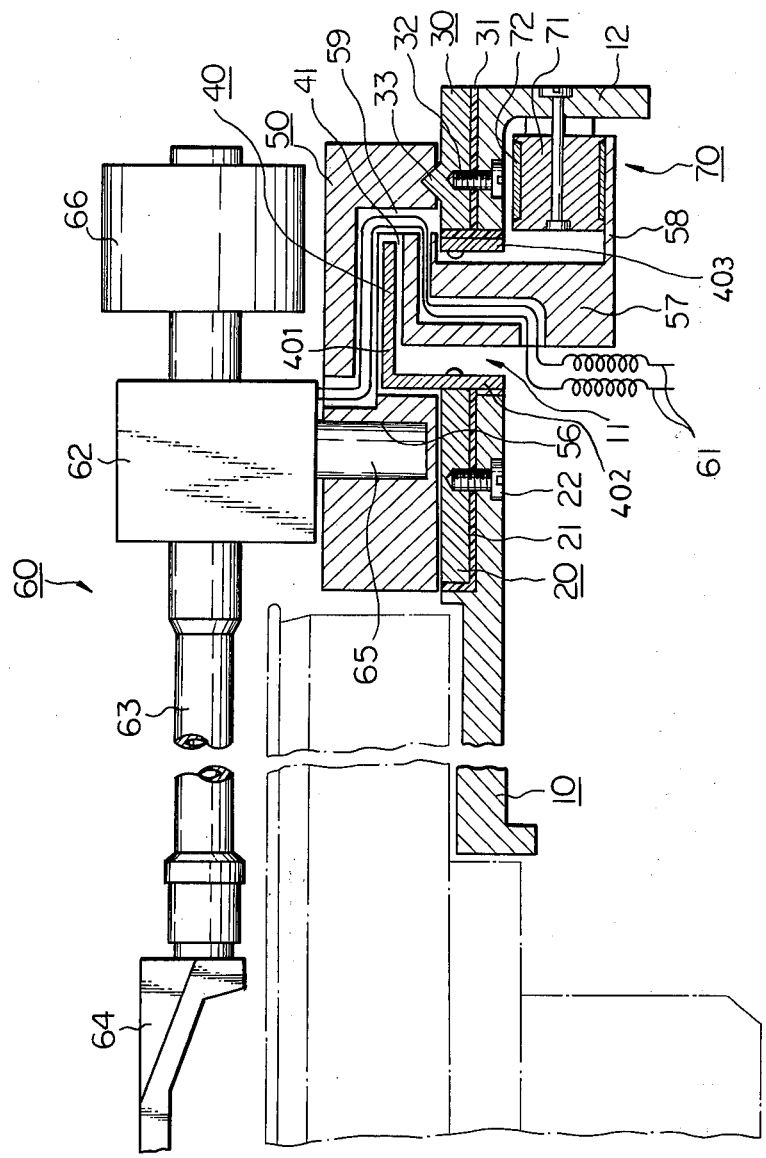
FIG. 2 is a sectional view taken along the line II-II in FIG. 1 with the exception that the driving pulley and its related parts are shown in sectional fashion.
Figure 3:
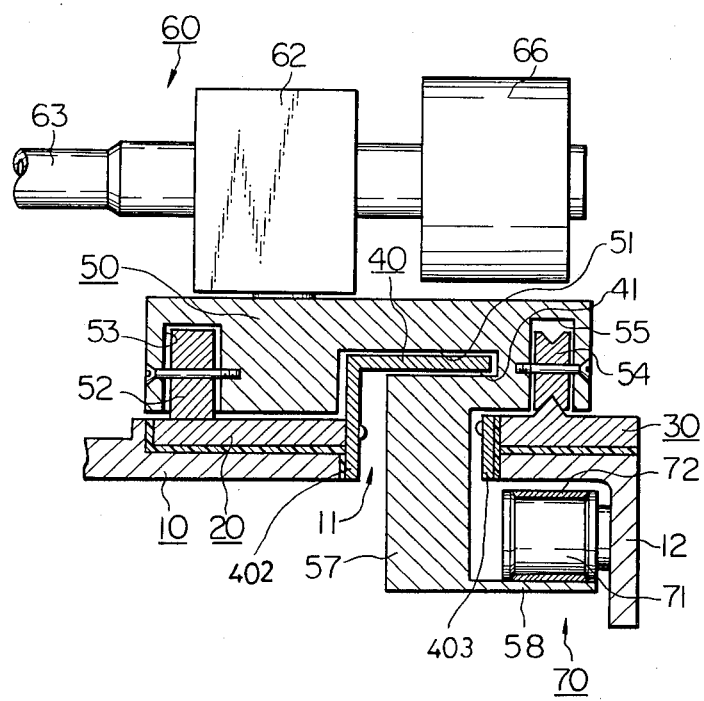
FIG. 3 is a sectional view taken along the line III-III in FIG. 1.

Referring to FIGS. 1–3, the present invention is applied to an audio record player. The apparatus comprises, as major elements, a base member 10, a pair of guide rails 20 and 30 arranged atop the base member 10 running in parallel to each other, an elongated cover 40 arranged in parallel to and between the pair of guide rails 20 and 30 while somewhat projecting upwardly from the top surface of the base member 10, a carriage 50 arranged so as to move along the cover 40, a tone arm 60 and its related parts mounted atop the carriage 50 and a driving mechanism 70 for the carriage 50 arranged below the base member 10, the pair of guide rails 20 and 30 and the cover 40 extending substantially at a right angle to the radial direction of the turntable T which is shown in FIG. 2 with dot-dash lines.

A wide vertical slit 11 is formed through the base member 10 extending in the moving direction of the carriage 50. One of the guide rails, i.e. the front guide rail 20 is secured to the top surface of the base member 10 via a shock absorbing layer 21, which is preferably made of a resilient material such as rubber, by a set screw 22 on the front side of the vertical slit 11. The other of the guide rails, i.e. the back guide rail 30 is secured to the top surface of the base member 10 via a shock absorbing layer 31, which is preferably also made of a resilient material such as rubber, by a set screw 32 on the back side of the vertical slit 11. This back guide rail 30 is provided on the top surface thereof with an elongated projection 33 which is elongated in the moving direction of the carriage 50. Both guide rails 20 and 30 are so arranged that the top surfaces thereof are substantially flush with each other.

The elongated cover 40 is made of a channel-shaped metal or resin material and comprises an upper horizontal part 401, a front rim 402 and a back rim 403 both of which extend downwardly, at right angle, from the horizontal part 401. The front rim 402 is secured to the back face of the front guide rail 20 via a suitable set screw and the back rim 403 is secured to the front face of the back rail 30 via a suitable set screw. Thus, except for the lower portions of the front 402 and back 403, the major portion of the cover 40 projects from the top surface of the guide rails 20 and 30. The cover 40 is provided with a horizontal slit 41 formed through downwardly extending back rim 403 for the purposes hereinafter described and the horizontal slit 41 extends at shortest over the entire moving ambit of the carriage 50.

The carriage 50 is provided with a horizontal through opening or cut-out 51 formed in the moving direction thereof and by way of which the carriage spacedly and movably rides upon the cover 40 as best seen in FIG. 3. On the front side of the horizontal opening 51, two or more sets of wheels 52 are rotatably journaled in recesses 53 formed in the bottom surface of the carriage 50, with their axes being arranged substantially at a right angle to the moving direction of the carriage 50. In a similar fashion, two or more sets of wheels 54 are rotatably journaled in the botton recesses 55. These wheels 54 are provided with peripheral grooves in order to snugly engage with the projection 33 of the back guide rail 30. As the carriage 50 moves, the wheels 52 and 54 roll on and along the respective guide rails 20 and 30 and, thanks to the engagement of the peripheral grooves of the back wheels 54 with the projection 33 (FIGS. 1 and 2) of the back guide rail 30, the position of the carriage 50 normal to the moving direction thereof always being maintained constant. The diameters of the wheels 52 and 54 are chosen that the bottom surface of the carriage 50 does not slide in contact with the top surfaces of the guide rails 20 and 30.

The projection 33 on the back guide rail 30 may be substituted for a similar projection formed in the front guide rail 20 and, in this case, the front 52 should be provided with peripheral grooves engageable with the projection and the back wheels 54 are provided with flat peripheral surfaces. When extremely reliable positioning of the carriage 50 in the direction normal to its movement is required, projections may be provided on both guide rails 20 and 30 and peripheral grooves may be formed on both side wheels 52 and 54.

As a further substitute, a straight guide groove may be formed in the top surface of at least one of the guide rails 20 and 30 and, in such a case, annular projections may be formed on the peripheral surfaces of the corresponding side wheels, the projection being snugly received and rolling in the groove as the carriage 50 moves.

A vertical hole 56 is formed in the top surface of the carriage 50 for the mounting of the tone arm and its related parts 60 as described hereinbelow.

As can be seen in FIG. 3, the carriage 50 is further provided with a bottom block 57 which extends, from a bottom portion near the back wheels 54, into the inner cavity of the cover 40 through the back side horizontal slit 41 of the cover 40, bends downwardly, extends downwardly far beyond the bottom surface of the base member 10 and again bends rearwardly in order to form a horizontal bottom rim 58.

A bent passageway 59 is formed through the upper body of the carriage 50 and its bottom block 57 in order to afford a passage for lead wires 61 connecting the phonograph pickup to a given external electric circuit. (See FIG. 2).

A tone arm and its related parts 60 comprises a square gimbal support 62, a tone arm 63 resiliently supported by the gimbal support 62, a conventional pickup cartridge 64 mounted to the front end of the tone arm 63 and a counter weight 66 mounted near the rear end of the tone arm 63. The square gimbal support 62 is provided at the bottom thereof with a cylindrical projection 65 which should be inserted into and secured to the vertically aligned hole 56 of the carriage 50 in order to fixedly mount the tone arm and its related parts 60 onto the carriage 50.

The gimbal support 62 is of any known conventional type for supporting the tone arm 63 for free swingable movement in both the vertical and the horizontal plane. In a typical example, the tone arm 63 is carried in an inner casing in a vertically swingable arrangement and the inner casing is carried in an outer casing in a horizontally swingable arrangement. The gimbal support 62 is further internally provided with a mechanism for detecting the offset angle of the tone arm 63 which is of any known conventional type. In the case of the above-described example, a shutter plate having a light passable triangular slit may be disposed to the inner casing and a fixed light source and a fixed photoelectirc cell may be arranged spacedly sandwiching the shutter plate. Horizontal swinging of the inner casing, i.e. deviation of the tone arm 63 from true tangency to the record groove, causes correspondingly displacement of the shutter plate change in the magnitude of light to be received by the photoelectric cell. As the cell is connected to a given offset angle detecting circuit, this change develops a corresponding offset signal which is transferred to a given servo-motor in order to energize the driving mechanism 70 as hereinafter described.

The base member 10 is provided at the rear end thereof with a downwardly extending vertical rim 12 which rotatably carries a pair of mutually spaced pulleys 71 of the driving mechanism 70. The distance between the axes of the pair of pulleys 71 should be at least as long as the moving ambit of the carriage 50. A closed loop belt 72 is entrained around the pulleys 71 in the moving direction of the carriage 50. This belt 72 is fixed by any suitable fastening means at any suitable portion along the length thereof to the top surface of the horizontal rim 58 of the bottom block 57 of the carriage so that running of the belt 72 causes corresponding movement of the carriage 50 along the cover 40 and the guide rails 20 and 30. Alternatively, the drive may be obtained by the frictional engagement between the belt and the carriage.

Figure 4:
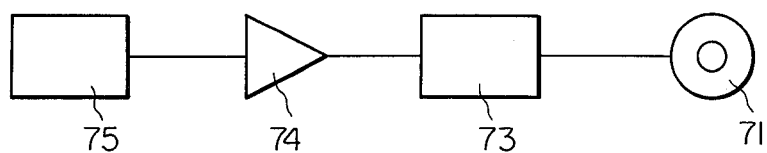
FIG. 4 is a block diagram of the offset angle detecting and cancelling system.

As shown in FIG. 4, one of the pulleys 71 is coupled to the output shaft of the given servo-motor 73 which is coupled, via a suitable amplifier 74, to the offset angle detecting circuit 75.

In a modified embodiment of the present invention, the rear rim 12 may be omitted, the pulleys 71 may be disposed to the bottom surface of the base member 10 with their axes being arranged in the vertical direction and the belt 72 running around the pulleys 71 may be fixed, at a suitable portion along the length thereof, to one of the side faces of the bottom block 57 of the carriage 50. In any case, the construction is so arranged that running of the belt 72 caused by the servo-motor 73 should cause corresponding movement of the carriage 50 thanks to the engagement of the belt 72 with the bottom block 57 of the carriage 50.

Operation of the apparatus of the present invention having the above-described construction is as hereinafter described in detail.

In operation, the pickup cartridge 64 is presented to the record groove with its longitudinal axis in line with the tangent to the record groove at that point and, as the pickup cartridge 64 moves in a linear mode, i.e. it remains parallel to itself while following the record groove, no offset signal will be produced and the apparatus of the present invention remains substantially inoperative.

When the pickup cartridge 64, i.e. the tone arm 63 deviates from the true tangency to the record groove, the above-described detecting mechanism of the offset angle of the tone arm 63 instantly detects this deviation and the offset angle detecting circuit 75 accordingly produces a corresponding offset signal which is transmitted to the servo-motor 73. As a result of this energization, the servo-motor 73 runs the belt 72 in the direction and over the distance required to cancel this deviation, whereby the carriage 50 with the tone arm and its related parts 60 are moved in the same direction over the same distance. During this movement, the position of the carriage 50 normal to the moving direction can be very precisely constrained so as to be unchanged thanks to the meshing engagement of the carriage bottom with at least one of the guide rails 20 and 30.

In FIGS. 5, 6, 7, 8, 9 and 10, there are shown various arrangements for the guide rails 20 and 30 and for the side wheels 52 and 54.

The schematic view of FIG. 5 corresponds to the view of FIG. 3 and shows a groove in the back side wheel 54 and a corresponding projection on cooperating rail 30. In the schematic view of FIG. 6, a reversal of this structure is provided in which the back rail 309 is smooth and back wheel 54a sides thereon; but front rail 20a has a projection and front wheel 52a has a groove to engage the same.

In FIG. 7, the schematic showing is a combination of the structures of FIGS. 5 (also FIG. 3) and 6. Here both rails 30b and 20b have projections and the front and back wheels 52b and 54b have grooves.

In FIG. 8, the schematic showing is of a rear rail 30c having a groove and the rear side wheels 54c having corresponding projections. The front rail 20c and front wheels 52c are smooth. In FIG. 9, a reversal of the parts of FIG. 8 is shown wherein the front rail 20d has a groove and the wheels 52d have projections. The rails 30d and wheels 54d are smooth. In FIG. 10, a combination of the structure of FIGS. 8 and 9 are shown in which both rails 20e and 30e have grooves and both front and back wheels 52e, 54e have projections.

In accordance with the present invention, only the minimum necessary opening, i.e. the horizontal slit 41, is formed in the "backside rim" of the cover 40 and the dimension of the opening is quite limited so as to be of a size allowing the free passage of the bottom block 57 of the carriage 50 only. Thus, undesirable entry of foreign matter such as dust into the interior of the apparatus can be effectively minimized. In addition absence of slits or openings on the front side of the apparatus greatly improves external appearance of the phonographic disc player.

Further, when compared with the conventional supporting arrangement for tone arms, the vertical position of the center of gravity of the tone arm and its related parts is located very close to the vertical position of the wheels for movement of the carriage. This assures very stable posture and movement of the carriage, thereby effectively minimizing undesirable tracking distortion and pressure on the side of the stylus tip carriage by the pickup cartridge. The disposition of the wheels almost wholly covered by the carriage further enhances external appearance of the record player. Supporting of the carriage by a pair of parallel guide rails via the wheels, whose top surfaces are almost flush with each other, assures a further stabilized movement of the carriage and excellent balance of the weight of the tone arm and its related parts.

Provision of the bottom block extending downwardly of the main body of the carriage results in lower positioning of the center of gravity of the entire carriage structure, whereby the posture and movement of the carriage on and along the guide rails is additionally stabilized.

What is claimed is:

1. Improved apparatus for supporting phonograph tone arms in which said phonograph has a servo-motor; carriage driven by said servo-motor; said carriage supporting a tone arm and its related parts for movement along a linear path which is substantially normal to an imaginary radial line extending between the center of the phonograph turntable and said path comprising:

a base member having an elongated opening;

a pair of mutually parallel guide rails arranged on said base member while being spaced from each other along said base member opening and extending in the direction of movement of said carriage substantially over the entire moving ambit of the latter;

an elongated cover arranged between said guide rails extending substantially over the entire moving ambit of the carriage, projecting above the top surfaces of said guide rails and defining an elongated horizontal slit extending along the back thereof;

said carriage having a horizontal passageway by way of which said carriage spacedly and movably rides over said cover;

front and back wheel assemblies each having wheels; mounting means for said assemblies in said carriage; said wheel assemblies being movable on and along said guide rails while supporting said carriage above said guide rails;

one of said guide rails cooperating with its associated wheels to restrain movement of said carriage in a direction transverse to said linear path;

a bottom block forming an integral part of said carriage and extending downwardly through the elongated opening formed in said base member and the horizontal slit of said cover, and a driving mechanism for said carriage disposed relative to said bottom block of said carriage operatively coupled to said servo-motor.

2. Improved apparatus as claimed in claim 1 in which one of said guide rails is arranged on the front side of the elongated opening in said base member and the other of said guide rails is arranged on the back side of said vertical slit.

3. Improved apparatus as claimed in claim 1 in which the top surfaces of said guide rails are substantially flush with the top surface of said base member.

4. Improved apparatus as claimed in claim 1 in which said cover is snugly received at the bottom portion thereof within the vertical slit of said base member and secured to the side faces of said guide rails.

5. Improved apparatus as claimed in claim 1 in which said carriage is provided with a passageway for lead wires connecting the phonographic pickup to a given outside electric circuit.

6. Improved apparatus as claimed in claim 1 in which said restraining means comprises at least one elongated projection formed on and along said top surface of one of said rails and placed in rolling meshing engagement with annular grooves formed on the peripheral curved surfaces of the wheels of one of said wheel assemblies.

7. Improved apparatus as claimed in claim 6 in which said restraining means comprises at least one elongated groove formed on and along said top surface of one of said rails and placed in rolling meshing engagement with annular projections formed on the peripheral curved surfaces of the wheels of one of said wheel assemblies.

8. Improved apparatus as claimed in claim 6 in which said projection is formed on and along said top surface of the front side guide rail and the wheels of said front wheel assembly are provided with said annular grooves engageable with said projection.

9. Improved apparatus as claimed in claim 6 in which said constraining means comprises a pair of elongated projections formed on and along said top surfaces of both of said guide rails and placed in rolling meshing engagement with annular grooves formed on the curved peripheral surfaces of the wheels of both of said wheel assemblies.

10. Improved apparatus as claimed in claim 1 in which said restraining means comprises annular projections formed on the peripheral surfaces of the wheels of at least one of said wheel assemblies placed in rolling meshing engagement with an elongated groove formed in and along the top surface of one of said guide rails.

11. Improved apparatus as claimed in claim 10 in which said annular projections are formed on the peripheral surfaces of the wheels of the back wheel assembly and said elongated groove is formed in and along the top surface of the back side of one of said pair of guide rails.

12. Improved apparatus as claimed in claim 10 in which said annular projections are formed on the curved peripheral surfaces of the wheels of said front wheel assembly and said elongated groove is formed in and along the top surface of the front side of said pair of guide rails.

13. Improved apparatus as claimed in claim 10 in which said annular projections are formed on the curved peripheral surfaces of the wheels of said front and back wheel assemblies and in rolling meshing engagement with elongated grooves formed in and along the top surfaces of said pair of guide rails.

14. Improved apparatus as claimed in claim 1 in which said driving mechanism comprises a pair of mutually spaced pulleys rotatably carried by said base member, one of said pulleys being operatively coupled to be driven by said servo-motor and a belt trained about said pulleys and connected to said bottom block of said carriage and running while winding around said pulleys.

15. Improved apparatus as claimed in claim 14 in wich said pulleys are arranged below the bottom of said base member.

* * * * *